US006373633B1

(12) United States Patent
Brown

(10) Patent No.: US 6,373,633 B1
(45) Date of Patent: Apr. 16, 2002

(54) SHAPING IRRADIANCE PROFILES USING OPTICAL ELEMENTS WITH POSITIVE AND NEGATIVE OPTICAL POWERS

(75) Inventor: Daniel M. Brown, Madison, AL (US)

(73) Assignee: MEMS Optical, LLC, Huntsville, AL (US)

( * ) Notice: Subject to any disclaimer, the term of this patent is extended or adjusted under 35 U.S.C. 154(b) by 0 days.

(21) Appl. No.: 09/610,884

(22) Filed: Jul. 6, 2000

(51) Int. Cl.⁷ .................. G02B 27/10; G02B 27/02; F21V 29/00

(52) U.S. Cl. ................ 359/618; 359/798; 362/268

(58) Field of Search .................. 359/625, 641, 359/618, 619, 626, 628, 798; 362/268

(56) References Cited

U.S. PATENT DOCUMENTS

| | | | | |
|---|---|---|---|---|
| 2,604,002 A | * | 7/1952 | Wengel | 396/385 |
| 4,769,750 A | * | 9/1988 | Matsumoto | 362/268 |
| 5,251,067 A | | 10/1993 | Kamon | 359/628 |
| 5,414,559 A | | 5/1995 | Burghardt et al. | 359/623 |
| 5,519,539 A | * | 5/1996 | Hoopman | 359/741 |
| 5,594,526 A | | 1/1997 | Mori et al. | 355/67 |
| 5,594,587 A | | 1/1997 | Komatsuda et al. | 359/619 |
| 5,594,752 A | | 1/1997 | Endriz | 372/50 |
| 5,615,047 A | * | 3/1997 | Komatsuda | 359/618 |
| 5,787,107 A | | 7/1998 | Leger et al. | 372/71 |
| 5,796,521 A | | 8/1998 | Kahlert et al. | 359/619 |
| 6,262,836 B1 | * | 7/2001 | Hudyma | 359/366 |

FOREIGN PATENT DOCUMENTS

JP  6-160606  *  6/1994  ............ G02B/3/00

OTHER PUBLICATIONS

"Binary–phase Fresnel Zone Plate Arrays For High–Power laser Beam Smoothing" *SPIE* vol. 2404, D.A. Pepler et al., Rutherford Appleton Lab., Chilton, Didcot, Oxfordshire, pp. 258–265.

"Advanced Concepts For UV Laser Beam Shaping With Non–rotationally Symmetric Optical Elements", *SPIE Proceedings*, vol. 3097, Lars Unnebrink et al. pp, 328–334.

"Mask Adapted Beam Shaping For material Processing With Excimer Laser Radiation", *SPIE Proceedings*, vol. 3573, pp. 108–111.

"Excimer Laser Illumination and Imaging Optics For Controlled Microstructure Generation", *SPIE*, vol. 1835 Excimer Lasers (1992), H.J. Kahlert et al., pp. 110–118.

"Novel Design Concepts For UV Laser Beam Shaping", Jörg Bernges et al.

"Multifaceted Laser Beam Integrators: General Formulation and Design Concepts", *Optical Engineering*, Nov., 1988, vol. 27, No. 11; Fred M. Dickey et al., pp. 999–1007.

\* cited by examiner

Primary Examiner—Georgia Epps
Assistant Examiner—Gary O'Neill

(57) ABSTRACT

A multi-aperture irradiation profile shaping system is presented that uses at least one arrangement of at least three apertures associated with a plurality of optical elements, wherein at least one optical element has positive optical power and another one element has negative optical power. The system may be implemented with the apertures in one, two, or three dimensions. The system yields a predetermined arbitrary irradiation profile on a target. The shape of the apertures may be any one of square, rectangular, and hexagonal. The shape of the apertures may also be asymmetric so that a rotation of the aperture shape by 180 degrees around an axis perpendicular to the surface of the aperture yields an inverted aperture shape. The system may be implemented with apertures having symmetric and asymmetric shapes that allow nearly 100% fill factor.

31 Claims, 13 Drawing Sheets

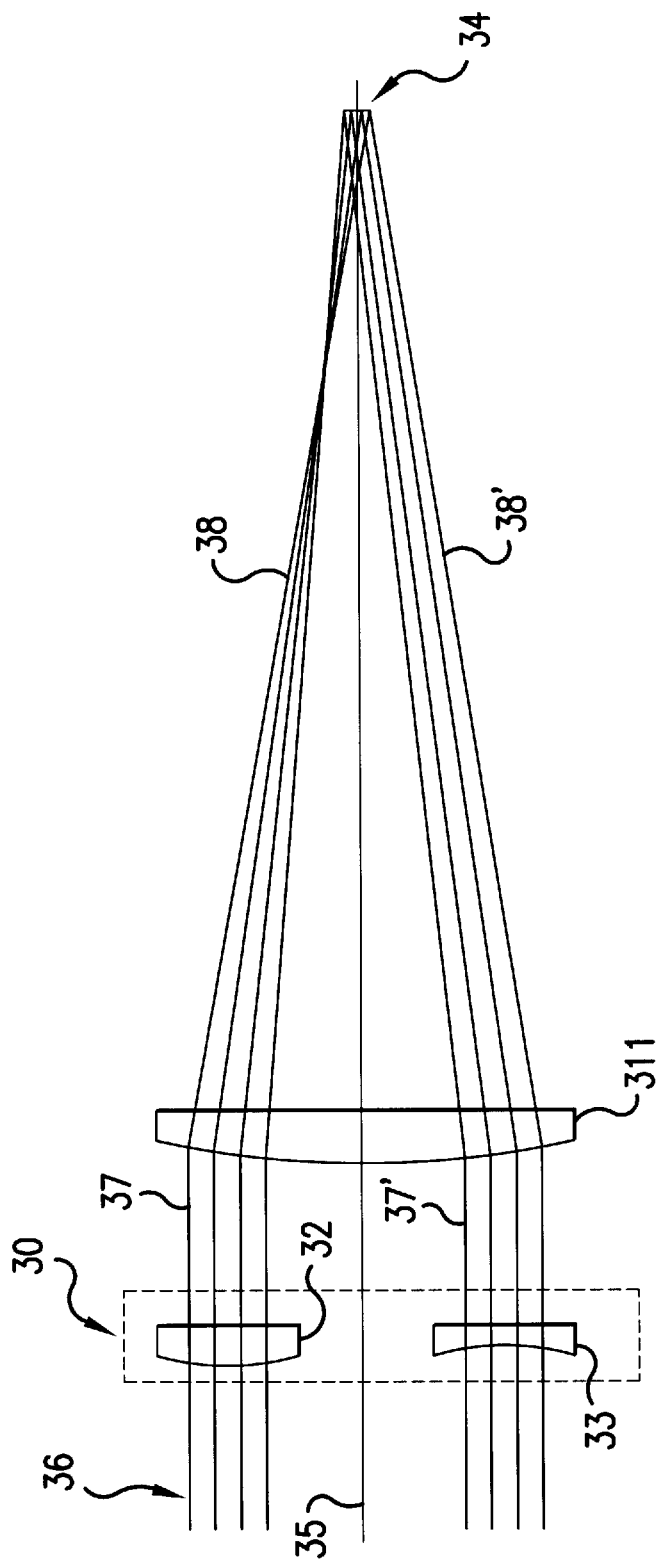
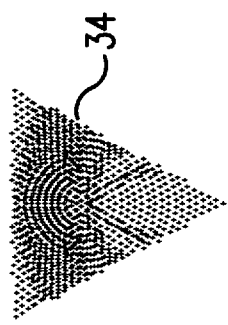
FIG.3a
FIG.3b

10 μm

SHAPING IRRADIANCE PROFILES USING OPTICAL ELEMENTS WITH POSITIVE AND NEGATIVE OPTICAL POWERS

FIELD OF THE INVENTION

The present disclosure is directed to an apparatus and a method that shape irradiation profile using optical elements having positive and negative optical powers.

BACKGROUND OF THE INVENTION

Many applications of irradiated energy require depositing energy irradiation, having specific profiles, on a target. The use of electromagnetic energy produced by lasers, of various kinds, is currently ubiquitous. By way of example, lasers, as sources of energy to be deposited on materials, are used in applications in the areas of laser heat processing, cutting, marking, photolithography, and fiber injection.

Quite often, applications that deposit energy on a target require the energy irradiance be substantially uniform on the target over a specified area and at a fixed longitudinal distance from the source. Quite often, also, one does not have exact control on energy beam modes of the laser or other emissive device (e.g., the modes may be unknown, there may be several of them, or they may change in time), beam collimation may not be feasible, or sufficiently achievable, or the source of energy may produce highly irregular irradiance distributions. Among sources of energy having the mentioned characteristics are excimer lasers (as well as other multimode laser beams), laser diode arrays, and arc sources.

In optics, the term "aperture" refers to an optically active region. For example, in a refractive element (e.g., a lens), the aperture is the area allowing the transmission of the incident irradiation through the optical element; in a reflective optical element (e.g., a mirror), the aperture is the area allowing reflection of the incident radiation; and in a diffractive optical element (e.g., Fresnel lens), the aperture is the area producing the diffracted irradiation from the incident irradiation.

Multi-aperture beam integration is an especially suitable technique for resolving the above-mentioned disadvantages of using energy sources wherein one does not have control on collimation, irradiance, or mode. Multi-aperture integrator systems basically consist of two components; 1) a subaperture array component consisting of one or more apertures (segmenting the entrance pupil or cross section of the beam into an array of beamlets), and 2) a beam integrator or focusing component (overlapping the beamlets from each subaperture at the target plane). A target is located at the focal point of the primary focusing element, where the chief rays of each subaperture intersect. Thus, the amplitude of the irradiance distribution on the target is a Fourier transform of the incoming wavefront modified by the lenslet array. The elements used in these systems have been refractive, reflective, or diffractive. Generally, all known multi-aperture integration systems use aperture elements that have the same shape and phase function.

Multi-aperture beam integrating techniques, however, require attention to obtaining efficient fill-factors lest they direct away a significant amount of available energy from a target. Consequently, the implementations have generally been limited to the stacking of apertures having square, rectangular, and hexagonal shapes because stacking of these aperture shapes provide nearly 100% fill factor at the aperture array. For example, U.S. Pat. No. 5,251,067 to Kamon describes achieving uniform illumination using a fly-eye lens device and system having an array of squares of different sizes. Pepler, et al [hereinafter Pepler] in an article titled "Binary-phase Fresnel zone plate arrays for high-power laser beam smoothing" (SPIE Vol. 2404, pages 258–265, 1995) describe facilitating the generation of uniform "top-hat" intensity profiles and spatially shaped foci using Fresnel binary phase zone plate arrays that have square, rectangular, and hexagonal apertures.

Quite a few applications depositing energy on a target, however, have target shapes not limited to squares, rectangles, and hexagons. The near field pattern of a square, rectangle, and hexagon is of the same type—namely, square, rectangle, and hexagon, respectively. For applications requiring target illumination not limited to these shapes, therefore, currently used multi-aperture beam integrating systems do not efficiently deposit predetermined desired energy patterns on the target.

SUMMARY OF THE INVENTION

It is the objective of this invention to provide efficient energy deposition on targets having arbitrary shapes. It is also the objective of this invention to shape the irradiation profile on a target to arbitrary yet specific target shapes.

The invention realizes these and other objectives using an arrangement having an array of at least three apertures, an array of optical elements (each aperture being associated with one optical element), wherein at least one aperture (along with the optical element with which the aperture is associated) has a positive optical power and at least one aperture (along with the optical element with which the aperture is associated) has a negative optical power. Positive and negative optical powers cause wavefronts of incident irradiation to converge and diverge, respectively, after exposure to the array of apertures. The principles of the invention may be practiced by arranging the apertures in one, two, or three dimensions.

The invention realizes these objectives by further having the shape of the apertures be any one of square, rectangular, and hexagonal. The invention realizes these objectives by having the apertures in the alternative be asymmetric so that a rotation of the aperture shape by 180 degrees around an axis perpendicular to the surface of the aperture yields an inverted aperture shape. The invention realizes these objectives by further having a primary optical element direct the irradiance onto a target. The invention realizes these objectives by having a zooming optical combination as the primary optical element.

BRIEF DESCRIPTION OF THE DRAWINGS

FIG. 3a is a schematic view of an optical layout of a refracting beam integrator in accordance with an embodiment of the present invention, wherein the apertures and their associated optical elements are arranged in a two dimensional arrangement.

FIG. 3b is a representation of the irradiation profile on target when the apertures used in the optical layout of FIG. 3a are as in FIG. 2a.

DETAILED DESCRIPTION OF THE PREFERRED EMBODIMENTS

In general terms, the inventive concept presents an arrangement of a plurality of at least three apertures wherein at least two apertures have optical powers of one of negative and positive optical power and the remaining apertures have the other kind of optical power.

Figures 1A, 1B, 1C:
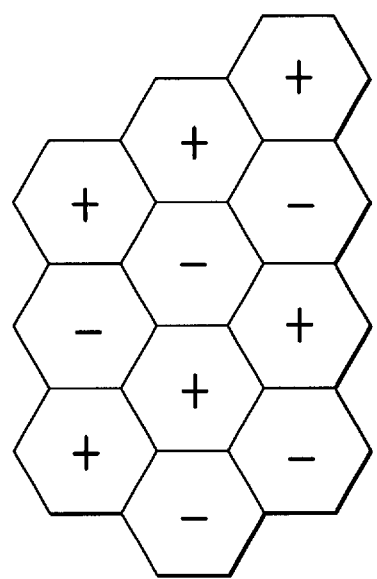
FIG. 1a is a schematic view of a plurality of square shaped apertures having optical elements with positive and negative optical power in accordance with a teaching of the present application.
FIG. 1b is a schematic view of a plurality of rectangular shaped apertures having optical elements with positive and negative optical power in accordance with a teaching of the present application.
FIG. 1c is a schematic view of a plurality of hexagonal shaped apertures having optical elements with positive and negative optical power in accordance with a teaching of the present invention.

FIGS. 1a–c show the arranging of symmetric apertures allowing nearly 100% fill factor. For the purposes of this disclosure, a symmetric shape for an aperture is defined as one where a 180 degree rotation around an axis perpendicular to the surface of the aperture results in the same aperture shape. FIG. 1a shows a plurality of square apertures; FIG. 1b shows a plurality of rectangular apertures; and FIG. 1c shows a plurality of hexagonal apertures. Rotating any of the apertures in FIGS. 1(a–c) by 180 degrees around an axis perpendicular to the surface of the aperture yields the same aperture shape.

For symmetric apertures, an aperture is assigned a positive or a negative sign and an optical element (e.g., a lens) having an optical power that is of the same sign is associated with the aperture. For example, in FIG. 1, diagonally related optical elements have the same optical power sign; this choice however may be replaced by other choices as required to achieve a specific irradiation profile on target, subject to the arrangement having at least one optical element having positive optical power and one optical element having negative optical power.

Figure 2A:
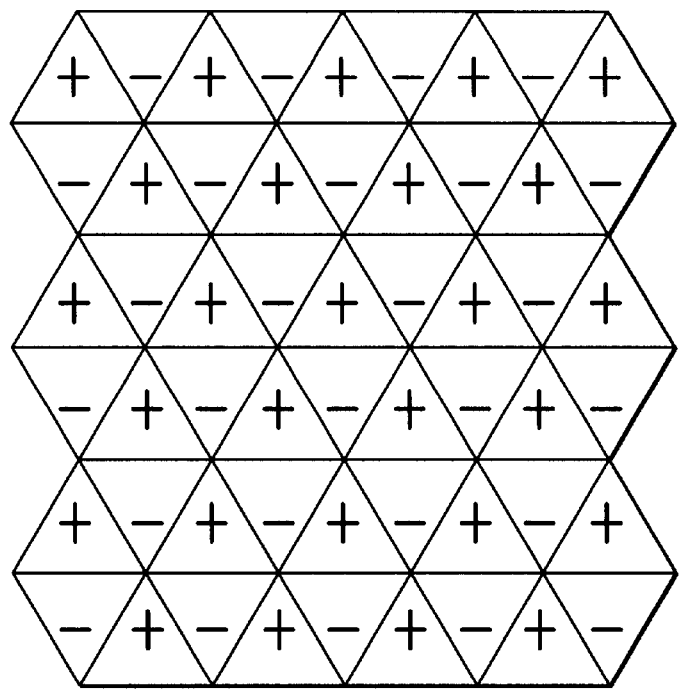
FIG. 2a is a schematic view of a plurality of triangular apertures having optical elements in a hexagonal packing with positive and negative optical power in accordance with a teaching of the present invention.
Figure 2B:
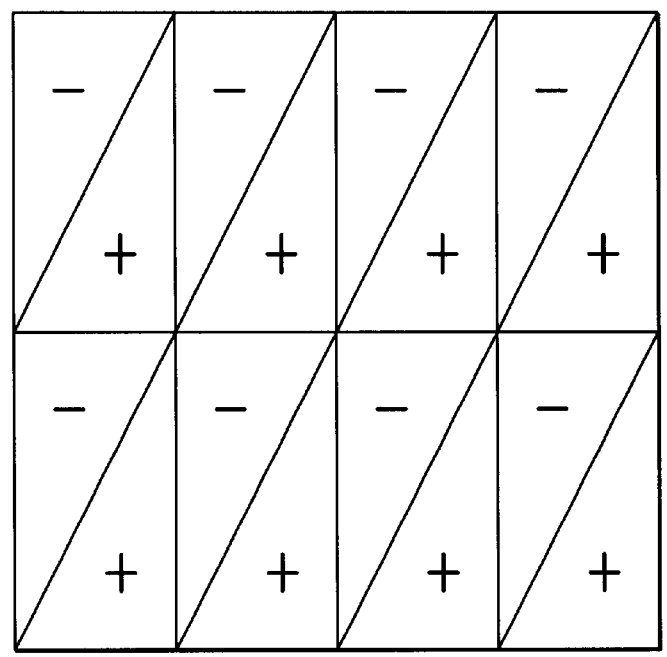
FIG. 2b is a schematic view of a plurality of triangular apertures having optical elements in a rectangular packing with positive and negative optical power in accordance with a teaching of the present invention.
Figure 2C:
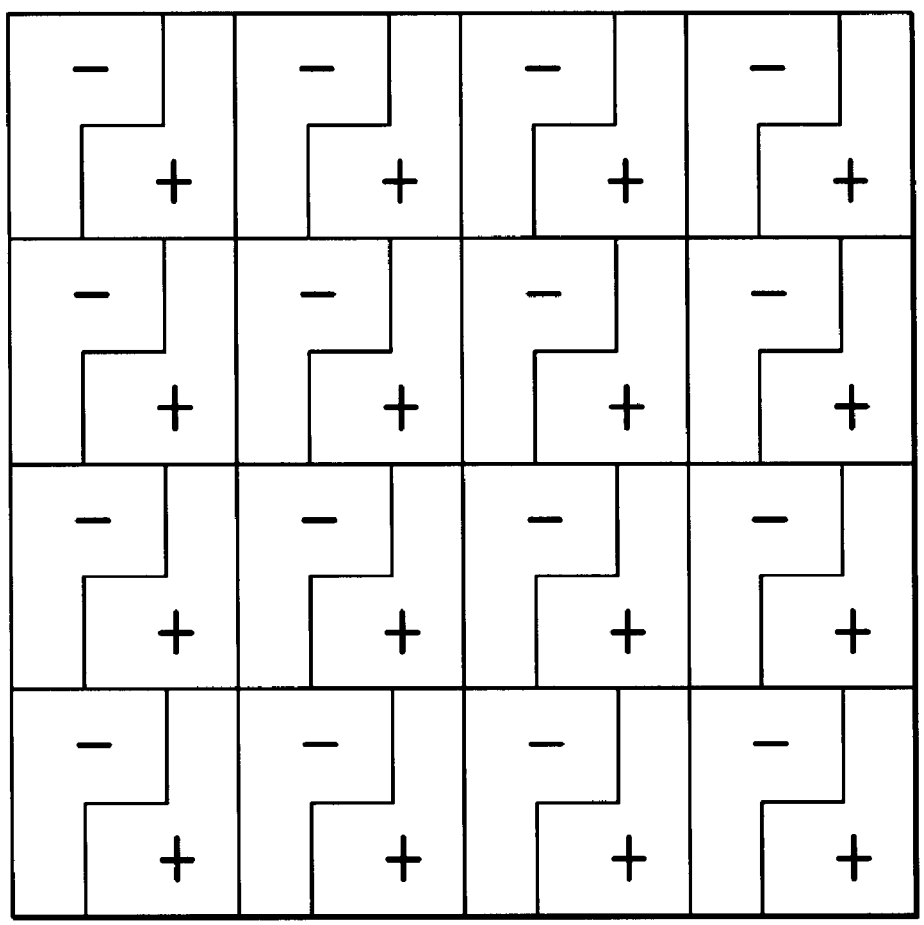
FIG. 2c is a schematic view of a plurality of L-shaped apertures having optical elements in a rectangular packing with positive and negative optical power in accordance with a teaching of the present invention.

Instead of being symmetric, the shape of the apertures, forming the arrangement, may be asymmetric. This is necessary if a target requires a specific non-symmetric irradiation profile. For the purposes of this disclosure, an asymmetric shape for an aperture is defined as one where a 180 degree rotation around an axis perpendicular to the surface of the aperture results in a mirror image inverted shape of the aperture. If one desires to obtain a nearly 100% fill factor, then the usable asymmetric shapes are limited to those shapes where a packing of a plurality of such asymmetric shapes results in a square, rectangular, or hexagonal shape. For example, FIGS. 2a and 2b present arrangements where the plurality of apertures have triangular shapes arranged into underlying hexagonal and rectangular shapes, respectively. FIG. 2c, on the other hand, presents an arrangement where the plurality of apertures have L-shapes being arranged into an underlying rectangular shape.

For an arrangement of asymmetric apertures, the sign of an aperture with narrow end pointing up may be chosen as positive and the sign of an aperture having a narrow end pointing down will then be chosen as negative, shown in FIG. 2. To obtain an irradiation profile on a target that has the same shape as an individual asymmetric aperture, all apertures with positive/negative sign should have optical elements with positive/negative optical power associated with them. The reverse may also be followed, keeping in mind that the resulting profile on target will be mirror inverted. To obtain an irradiation profile on target that has a shape that is not similar (but is derived from asymmetric aperture shapes), some optical elements may have optical powers that are opposite to the chosen aperture/optical-element sign convention. The asymmetrically shaped apertures presented in FIG. 2 are not meant to be limiting, but rather they are presented as examples of arbitrary asymmetric aperture shapes.

The principles of the invention may be implemented with an arrangement of apertures along with their optical elements being arranged in one, two, or three dimensions.

Although in the following description a refractive lenslet will be used as describing the optical element with which an aperture is associated, the invention may be practiced with apertures associated with any of the various kinds of optical elements, including, but not limited to: reflective optics, diffractive optics, and Fresnel optics. Of course in addition to a separate aperture and optical element (with which the aperture is associated) the optical element may itself be the aperture.

A preferred embodiment presenting an arrangement of apertures and optical elements within a beam integrator layout is schematically depicted in FIG. 3a and consists of a single lenslet array (generally depicted as 30) and a positive primary lens 311. Only the rays for two outer lenslets 32, and 33 are drawn for clarity; an upper convex lenslet 32 and a lower concave lenslet 33. A collimated input beam 36 from an energy source is incident on the lenslet array 30. The lenslet array divides the incident beam into an array of beamlets (e.g., 37 and 37') that are then overlapped at a target 34 by the primary integrator lens 311.

An arrangement of at least three lenslets having at least one positive lenslet (having positive optical power) and at least one negative lenslet (having negative optical power) are provided in the array. Positive lenslets will produce a real beamlet focus ahead of the target plane (corresponding to lenslet 32 and beam 38 as shown in FIG. 3a). Negative lenslets will have a virtual beamlet focus either ahead of the lenslet array or behind the target plane, depending on the relative optical powers of the lenslets and primary lens (corresponding to lenslet 33 and beam 38' as shown in FIG. 3a). The principles of the invention may be practiced with all the lenslets having positive optical power being identical and all lenslets having negative optical power being identical as well. However, the principles of the invention may also be practiced with different magnitudes for the optical powers for the lenslets as well as different lenslet to primary lens 311 spacings.

The target plane is located at the focal point of the primary lens 311. The positive primary lens 311 focuses the chief rays of each beamlet to a common point on the target 34, thus overlapping the defocused beamlets at the target 34. If the lenses are sufficiently free of aberrations then the spot 34 formed at the focal point of the primary lens 311 will replicate the lenslet aperture.

Figure 3C:
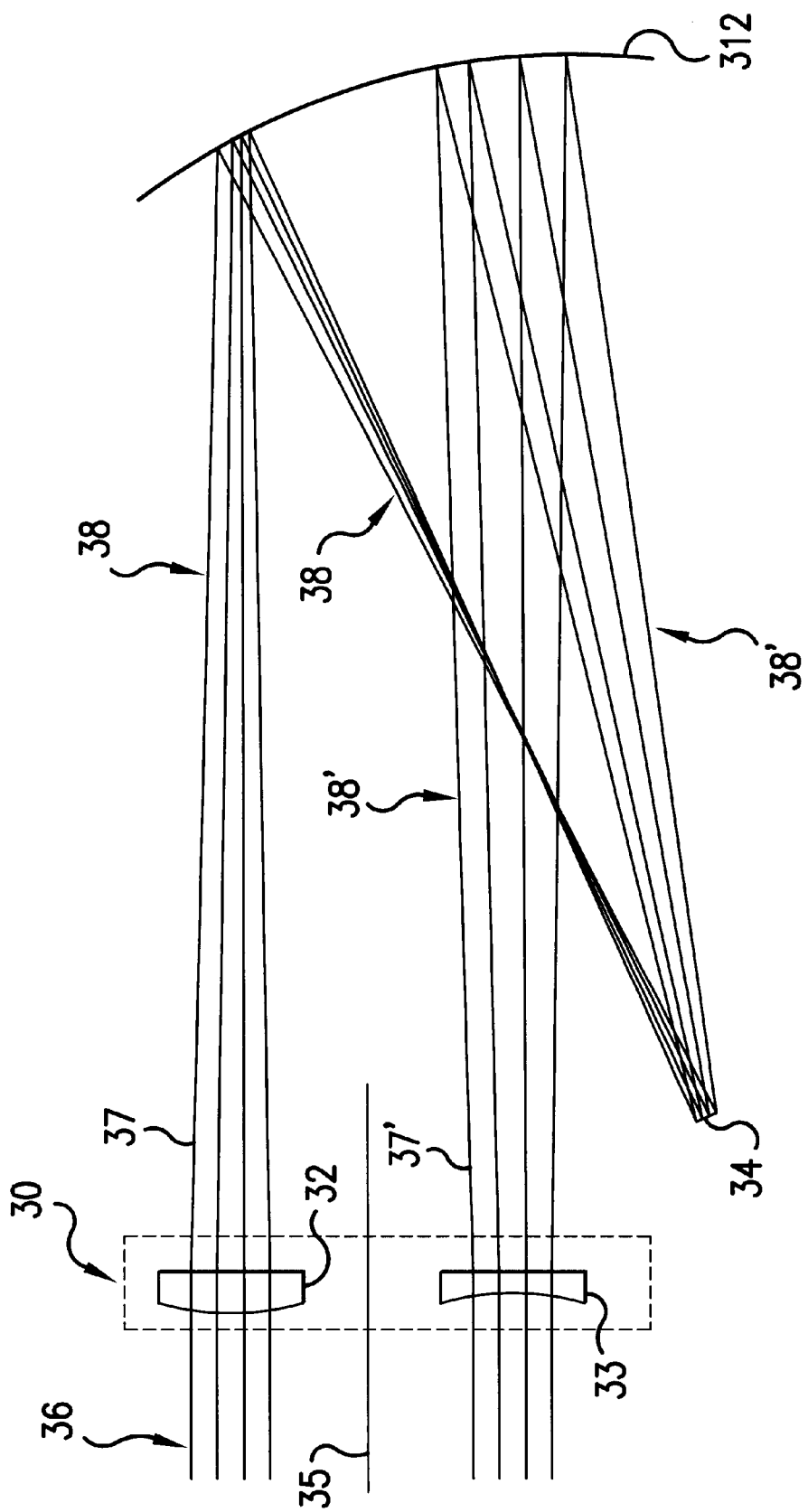
FIG. 3c is a schematic view of an optical layout of a reflecting beam integrator in accordance with an embodiment of the present invention, wherein the apertures and their associated optical elements are arranged in a two dimensional arrangement.

In practice, the focal length and shape of the primary lens 311 may be chosen so as to reduce aberrations (including chromatic or monochromatic), or else the primary lens 311 may be shaped so as to correct for aberrations that arise because of the angle and distance of beamlets from the optical axis 35. A primary reflective element may be used instead of the primary lens 311. FIG. 3c schematically shows another preferred embodiment similar to the one depicted in FIG. 3a except for replacing the primary lens 311 by the primary reflecting element 312 (e.g., a concave mirror).

The intensity of irradiation on a target is the sum of defocused diffraction spots (point spread functions) of an on-axis object point at infinity (assuming a collimated input wavefront). If the source is spatially coherent over a lenslet aperture, or can be defined by a single field point from a ray optics point of view, then the diffraction spot will closely replicate the shape of the subaperture with diffraction rings (determined by the degree of defocus and other aberrations) superimposed. If the arrangement of FIG. 2a is used for the arrangement of plurality of apertures along with the associated optical elements, then the irradiance profile on a target 34 will be as presented in FIG. 3b, ignoring the diffraction rings. However, any arrangement of symmetric or asymmetric aperture shapes maybe used instead of the arrangement depicted in FIG. 2a.

The spot size of the beam irradiance at target is given by:

Spot Size $(S)$=Focal Length of Primary $(F)/f$-number of lenslet; (1)

wherein, $f$-number of a lenslet=focal length of lenslet$(f)$/diameter of lenslet$(d)$. (2)

In another preferred embodiment, aberrations (including, but not limited to, lens profile design as well as lens tilt and rotation) may be added to the lenslets to modify into almost any shape the irradiation profile on a target. For example, FIGS. 4($a$–$m$) present a variety of different irradiance profiles on a target obtained using a two-by-two aperture/lenslet arrangement. The irradiation profiles shown in FIG. 4 were obtained using an optical layout schematically shown in FIG. 5a, which depicts four square apertures with their associated four anamorphic lenslets (e.g., 512 and 513, numbering only two aperture/lenslet combinations for simplicity) arranged into a two-by-two geometry arrangement 510 along with a primary integrating optical element 511; at least one of the aperture/lenslet combinations having positive optical power and another having negative optical power. The arrangement 510 and primary 511 reshape the profile of an incident irradiation and efficiently direct it onto a target 514.

The tilt, surface profile, and rotation of the lenslets are described by the parameters a1 and a2, a3 and a4, and $\theta$, respectively. The parameters a1 and a2 of a lenslet relate to tilts of a lenslet in the x and y directions, respectively (the z-axis being the primary optical element's optical axis). The parameters a3 and a4 of a lenslet relate to the profile of the surface of the lenslet in the x and y directions, respectively, which profile results in focusing or defocusing of beamlets going through the lenslet. The parameter $\theta$ of a lenslet relates to a rotation of the x-y axes of a coordinate system of the lenslet around the z-axis of the coordinate system of the arrangement so that the x-y axes of the lenslet are rotated by the angle $\theta$ with respect to the x-y axes of the arrangement. Higher order terms, e.g. 4th order, etc., may be added to shape with various additional aberrations the irradiation profile on a target.

Using tilt, surface curvature, and lenslet rotation around the z-axis, the surface profile of a lenslet may be described by:

$$z=a1*(x*\cos(\theta)+y*\sin(\theta))+a2*(y*\cos(\theta)Bx*\sin(\theta))+a3*(x*\cos(\theta)-y*\sin(\theta))^2+a4*(y*\cos(\theta)-x*\sin(\theta))^2. \quad (3)$$

Higher order terms, e.g. 4th order, etc., could be added to accomplish image shaping with various other aberrations.

The profiles of irradiation on the target 514, shown in FIG. 4, were obtained using the ZMAX ray-tracing program provided by Focus Software, Inc., using distance measurements in millimeters and angle measurements in degrees. The parameter values given below that produced FIG. 4 (including the focal length of 50 millimeters for the primary beam integrating optical element) are used only for demonstration purposes; the appropriate parameter values would be chosen based on the desired size and shape of irradiation profile on a target.

For consistency sake, looking in the direction of the incident irradiation onto the aperture-lenslet arrangement 510, the lenslet numbering in the following parameter tables is sequenced clockwise with the top left lenslet being numbered as lenslet 1.

Figure 4A:
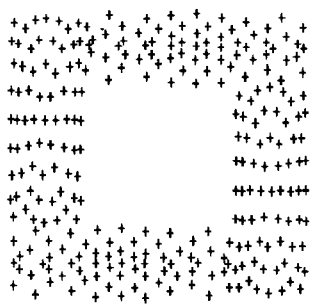
FIG. 4a–FIG. 4m shows the irradiation profile when the optical elements associated with a two-by-two square aperture in an optical layout similar to that of FIG. 3a are aberrated as specified in the detailed description.
Figure 5A:
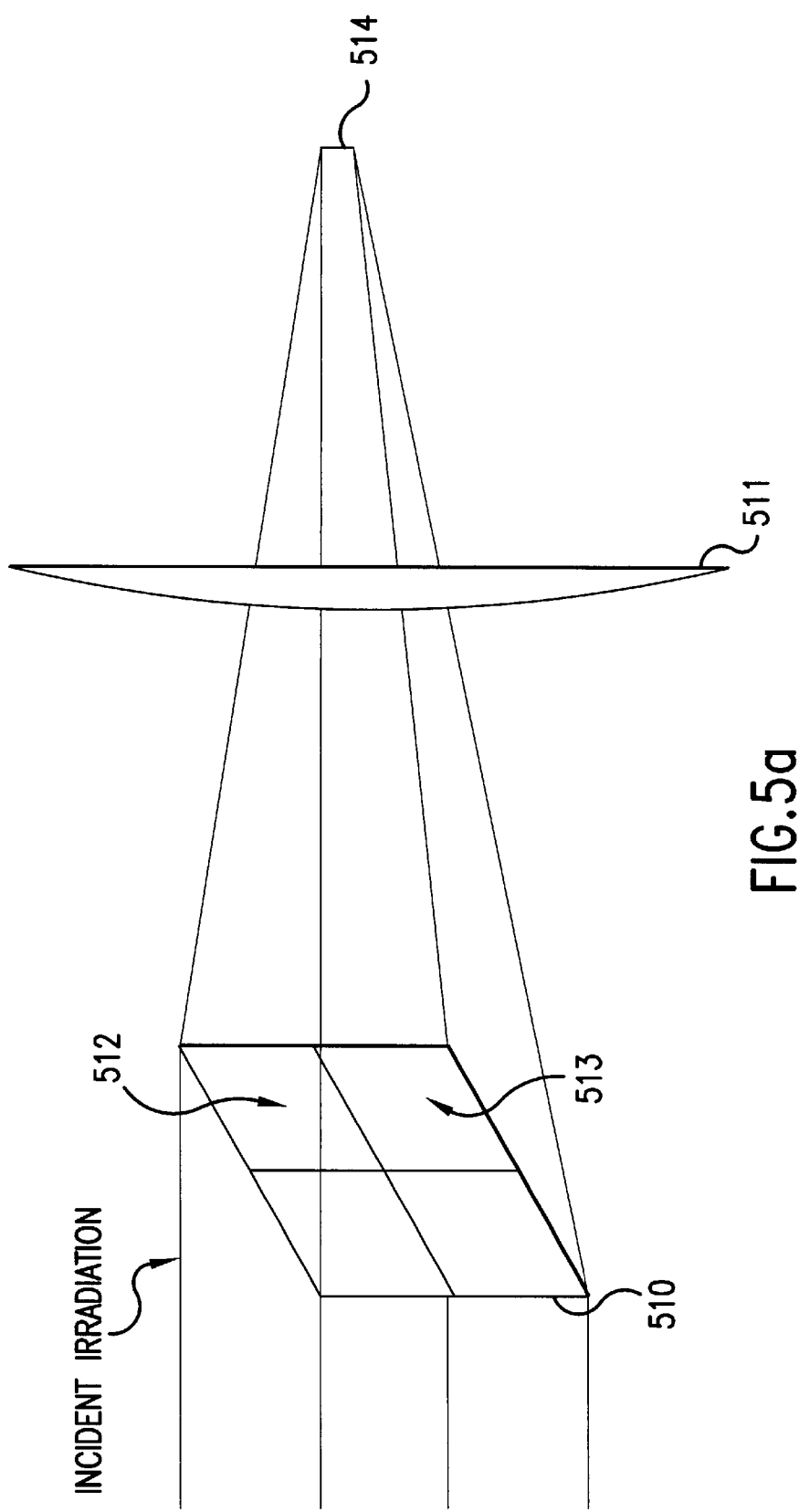
FIG. 5a is a schematic view of an optical layout of a refracting beam integrator in accordance with an embodiment of the present invention, wherein the apertures and their associated optical elements are arranged in a two dimensional arrangement.

To obtain the irradiation profile of the thick hollow square shown in FIG. 4a, the following parameters of Table 1 were used,

TABLE 1

|  | lenslet1 | lenslet2 | lenslet3 | lenslet4 |
| --- | --- | --- | --- | --- |
| a1 | 0.011 | −0.011 | 0.034 | −0.034 |
| a2 | 0.034 | −0.034 | −0.011 | 0.011 |
| a3 | −0.044 | −0.044 | 0.02 | 0.02 |
| a4 | −0.012 | −0.012 | 0.053 | 0.053 |
| $\theta$ | 0.0 | 0.0 | 0.0 | 0.0 |

In this case, it should be noted that lenslets 1 and 2 are similar, having a negative optical power with different magnitudes in the x and y directions; that lenslets 3 and 4 are also similar, having positive optical power with different magnitudes in the x and y directions; and that the lenslets have zero rotation around the z-axis (that is the x-y axes of the lenslets are not rotated with respect to the x-y axes of the arrangement of apertures/optical-elements).

Figure 4B:
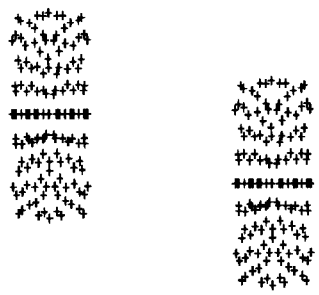
Figure 4C:
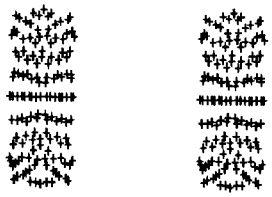

The shifted double rectangle irradiation profile shown in FIG. 4b is obtained using the same parameters as used to obtain the profile shown in FIG. 4a, except that a rotation angle θ of 90 degrees is applied to lenslets 1 and 2. The unshifted double rectangle irradiation profile shown in FIG. 4c is obtained using the same parameters as used in obtaining FIG. 4b, except that a1 is set equal to zero for lenslets 1 and 2, and a2 is set equal to zero for lenslets 3 and 4. The single rectangle irradiation profile shown in FIG. 4d is obtained using the same parameters as used in obtaining FIG. 4c, except that a1 and a2 are both set equal to zero for all four lenslets.

Figure 4D:
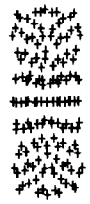

The irradiation profile in FIG. 4c and FIG. 4d are compared with the profile produced by the prior art Pepler (shown in FIG. 9b and FIG. 9d of Pepler). In Pepler, FIG. 9b shows an unshifted parallel double rectangle and FIG. 9d shows a single rectangle. The comparison of irradiation profiles shown in said figures disclosed herein and said figures disclosed in Pepler indicates that the irradiation profiles are similar, except that the irradiation profiles in Pepler have a central hot spot because they are far field images, which central hot spot is not present in said irradiation profile obtained by the present embodiment. Among the many differences between Pepler's approach and the embodiment described herein, the embodiment described herein (1) generates the irradiation profiles using fewer optical elements than used by Pepler to generate the similar profiles, (2) does not channel irradiation into forming a central hot spot as necessarily does Pepler; and (3) allows for the easy manipulation of the optical elements to change the irradiation profile.

Figure 4E:
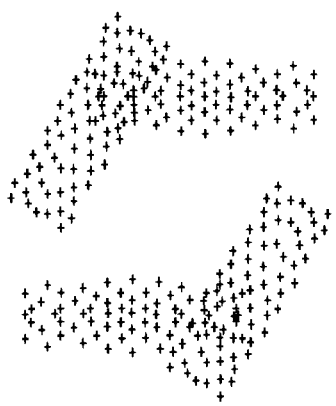

FIG. 4e presents the profile resulting when the parameters of FIG. 4a are changed by having θ equal −30 degrees for lenslets 3 and 4, the other parameters being the same as those producing the irradiation profile shown in FIG. 4a.

Figure 4F:
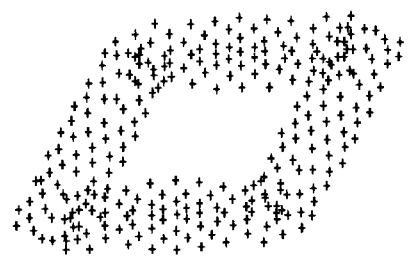

FIG. 4f shows an irradiation profile in the form of a thick trapezoid. This irradiation profile is obtained when the parameters are chosen as:

TABLE 2

|    | lenslet1 | lenslet2 | lenslet3 | lenslet4 |
|----|----------|----------|----------|----------|
| a1 | 0.011    | −0.011   | 0.03     | −0.03    |
| a2 | 0.025    | −0.025   | 0.02     | −0.02    |
| a3 | −0.044   | −0.044   | 0.02     | 0.02     |
| a4 | −0.012   | −0.012   | 0.053    | 0.053    |
| θ  | 0.0      | 0.0      | −30      | −30      |

Figure 4G:
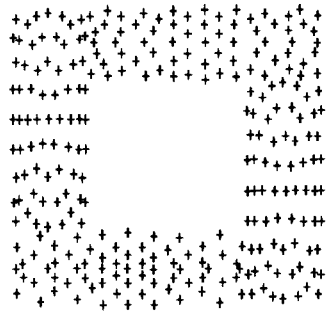

FIG. 4g presents another irradiation profile of thick hollow square using parameters as used to obtain the profile presented in FIG. 4a, except that a3 and a4 for lenslet 2 are 0.053 and 0.02, respectively. The parameters yielding the irradiation profile of FIG. 4g are:

TABLE 3

|    | lenslet1 | lenslet2 | lenslet3 | lenslet4 |
|----|----------|----------|----------|----------|
| a1 | 0.011    | −0.011   | 0.034    | −0.034   |
| a2 | 0.034    | −0.034   | −0.011   | 0.011    |
| a3 | −0.044   | 0.053    | 0.02     | 0.02     |
| a4 | −0.012   | 0.02     | 0.053    | 0.053    |
| θ  | 0.0      | 0.0      | 0.0      | 0.0      |

It should be noted that the arrangement yielding the irradiation profile of FIG. 4g has one lenslet (lenslet 1) having a negative optical power and three lenslets having positive optical powers (as opposed to the arrangement yielding the irradiation profile of FIG. 4a, which has two lenslets having negative optical powers and two lenslets having positive optical powers). A close look at FIG. 4a and FIG. 4g shows that the thick hollow squares presented therein are actually different although they have the same overall shape: The intensity distributions on the top sides of the thick hollow squares in FIG. 4a and FIG. 4g are different The difference is caused by the different redistribution onto the target of the rays representing the irradiation incident on the aperture-lenslet arrangements: The different redistribution being caused by the different lenslets. This capability of the invention herein presented may be advantageously used to manipulate the intensity profile of irradiation incident on the aperture-lenslet arrangement into different irradiation intensity profiles on a target. For example, one may homogenize non-uniform profile of incident irradiation to obtain more uniform irradiation profile on a target.

Figure 4H:
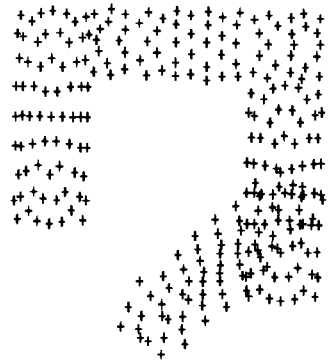
Figure 4I:
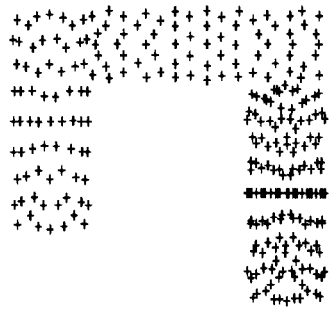
Figure 4J:
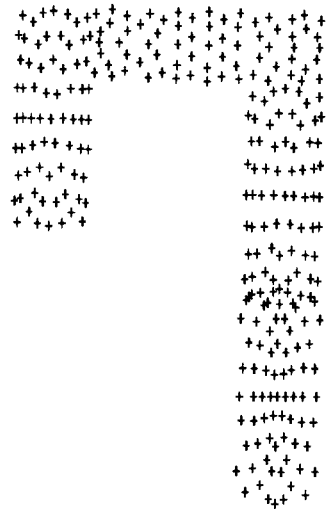

The next few figures demonstrate the affect of changing one or two parameters on the irradiation intensity profile. FIG. 4h presents the resulting modification in the irradiation profile of FIG. 4g when lenslet 1 is rotated by 45 degree, while other parameters for the lenslets are the same as in the arrangement yielding the irradiation profile shown in FIG. 4g. FIG. 4i presents the resulting modification in the irradiation profile of FIG. 4g when θ is 90 degrees for lenslet 1—other parameters for the lenslets being the same as in the arrangement yielding the irradiation profile shown in FIG. 4g. FIG. 4j presents the resulting modification in the irradiation profile of FIG. 4g when θ is 90 degrees and a1 is 0.07, both for lenslet 1—other parameters for the lenslets being the same as in the arrangement yielding the irradiation profile shown in FIG. 4g.

Figure 4K:
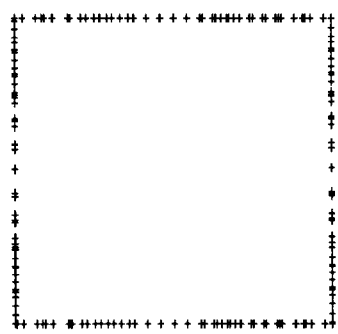

The principles of the invention may be implemented using an optical element having optical power in only one direction. For example, FIG. 4k shows an irradiation profile of a thin square on a target, obtained with parameters:

TABLE 4

|    | lenslet1 | lenslet2 | lenslet3 | lenslet4 |
|----|----------|----------|----------|----------|
| a1 | 0.0      | 0.0      | 0.05     | −0.05    |
| a2 | 0.05     | −0.05    | 0.0      | 0.0      |
| a3 | −0.05    | −0.05    | 0.0      | 0.0      |
| a4 | 0.0      | 0.0      | 0.05     | 0.05     |
| θ  | 0.0      | 0.0      | 0.0      | 0.0      |

Two of the four lenslets in this arrangement (lenslets 1 and 2) have negative optical powers in one direction and zero optical power in the other direction (i.e., lenslets 1 and 2 are diverging cylindrical lenslets) and the other two lenslets (lenslets 3 and 4) have positive optical power in one direction and zero optical power in the other direction (i.e., lenslets 3 and 4 are converging cylindrical lenslets).

Figure 4L:
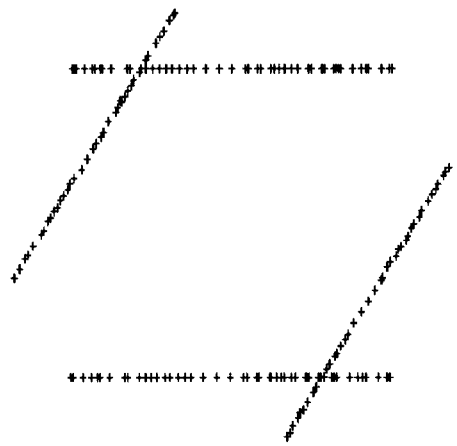
Figure 4M:
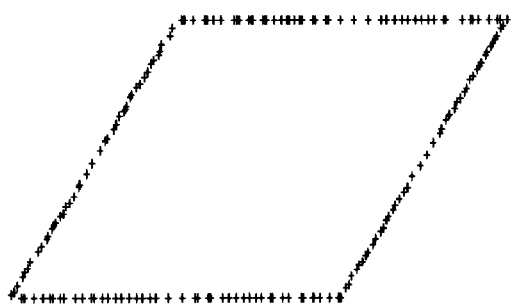

FIG. 4l shows the irradiation intensity profile obtained when θ equals 30 degrees for lenslets 3 and 4, and the other parameters are the same as those used to obtain the profile shown in FIG. 4k. FIG. 4m shows a thin trapezoid obtained using the parameters:

TABLE 6

|    | lenslet1 | lenslet2 | lenslet3 | lenslet4 |
|----|----------|----------|----------|----------|
| a1 | 0.03     | −0.02    | 0.05     | −0.04    |
| a2 | 0.045    | −0.045   | 0.03     | −0.025   |
| a3 | −0.05    | −0.05    | 0.0      | 0.0      |

TABLE 6-continued

|  | lenslet1 | lenslet2 | lenslet3 | lenslet4 |
| --- | --- | --- | --- | --- |
| a4 | 0.0 | 0.0 | 0.05 | 0.05 |
| θ | 0.0 | 0.0 | −30 deg | −30 deg |

Of course the various irradiation profiles that may be obtained are not limited to those shown in FIG. 4. The principles of the invention demonstrated through FIG. 4 may be applied using the two-by-two arrangement of square apertures as building blocks (either identical or different in size or shape or both size and shape) for other two dimensional arrangements. The principles of the invention may also be practiced with an arrangement of asymmetric apertures instead of symmetric apertures. For example, the two by two arrangement of square apertures may be implemented by vertex-up and vertex-down triangles (a combination of one of each up and down triangles forming a square). Using asymmetric apertures shapes, different aberration parameters may be used to obtain different irradiation profiles on a target. The principles of the invention may also be practiced by using building blocks n-by-n (or n-by-m, where n does not equal m) of different size or shape (or both) aperture/lenslet combinations that may be all asymmetric, all symmetric, or combination of symmetric and asymmetric aperture/lenslet combinations. Moreover, the arrangement of apertures and associated optical elements is not limited to being two by two, but rather combination of any number of rows and column of lenslets may be used. Moreover, the results demonstrated in FIG. 4 may be obtained using a two-dimensional arrangement of reflective optical elements instead of lenslets, choosing appropriate parameters to obtain desired irradiation profiles on targets.

Figure 5B:
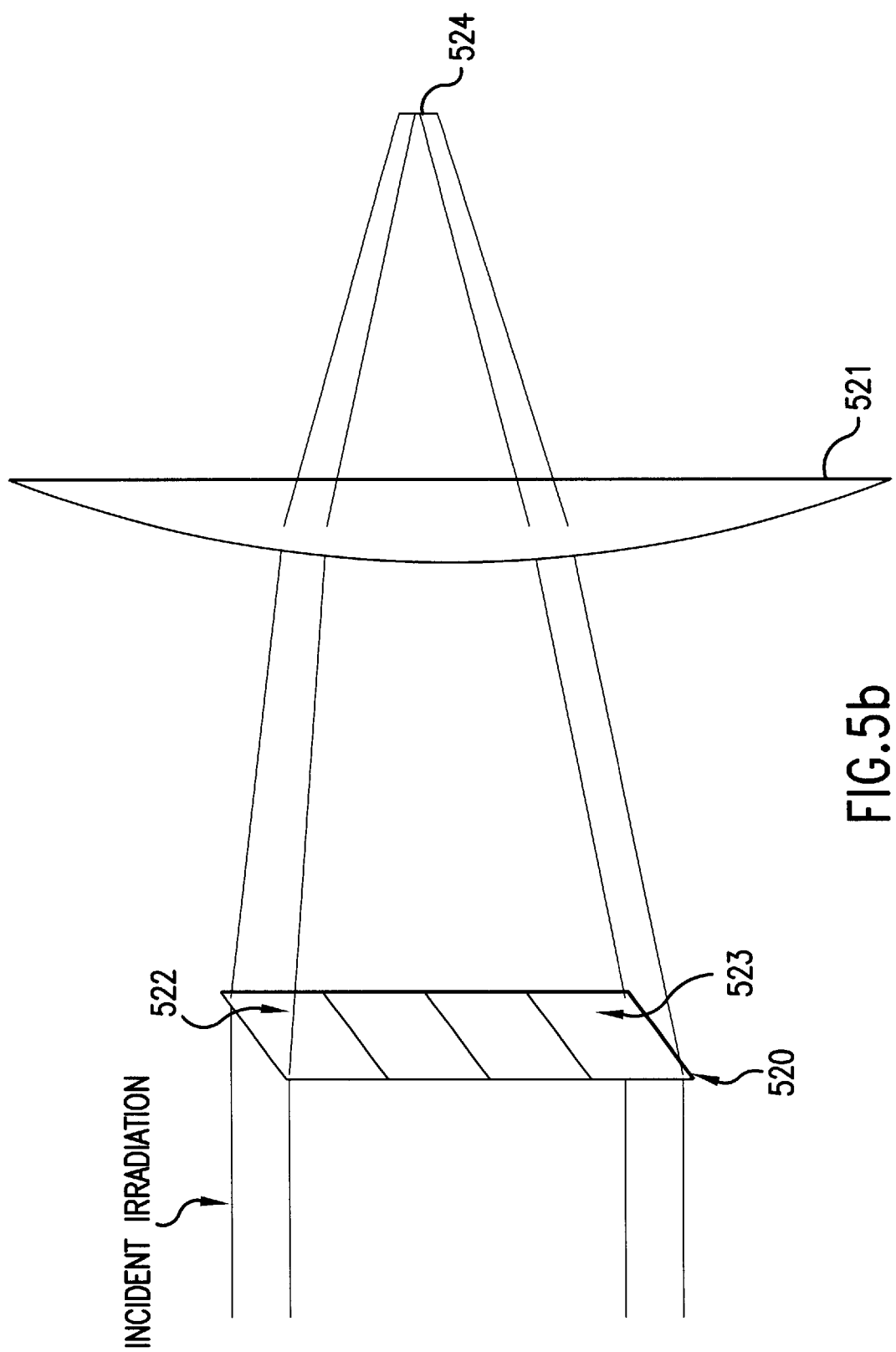
FIG. 5b is a schematic view of an optical layout of a refracting beam integrator in accordance with an embodiment of the present invention, wherein the apertures and their associated optical elements are arranged in a one dimensional arrangement.

In another preferred embodiment, the invention may be practiced using asymmetric or symmetric apertures arranged in a single dimension. For example, as schematically shown in FIG. 5b, at least three square apertures with associated lenslets (e.g., 522 and 523, numbering only two aperture/lenslet combinations for simplicity) may be arranged into a one dimensional arrangement 520; at least one of the aperture/lenslet combinations having positive optical power and another having negative optical power. This arrangement 520 along with a primary integrator optical element (e.g., lens 521) may be used to reshape the profile of an incident irradiation (for example, to rehomogenize an incident irradiation having nonuniform profile) and efficiently direct the incident irradiation onto a target 524. The irradiation profile on a target would depend on and be specific to (1) the shapes of used apertures, and (2) the characteristics of used lenslets. The lenslets may be separate from the apertures.

Figure 5C:
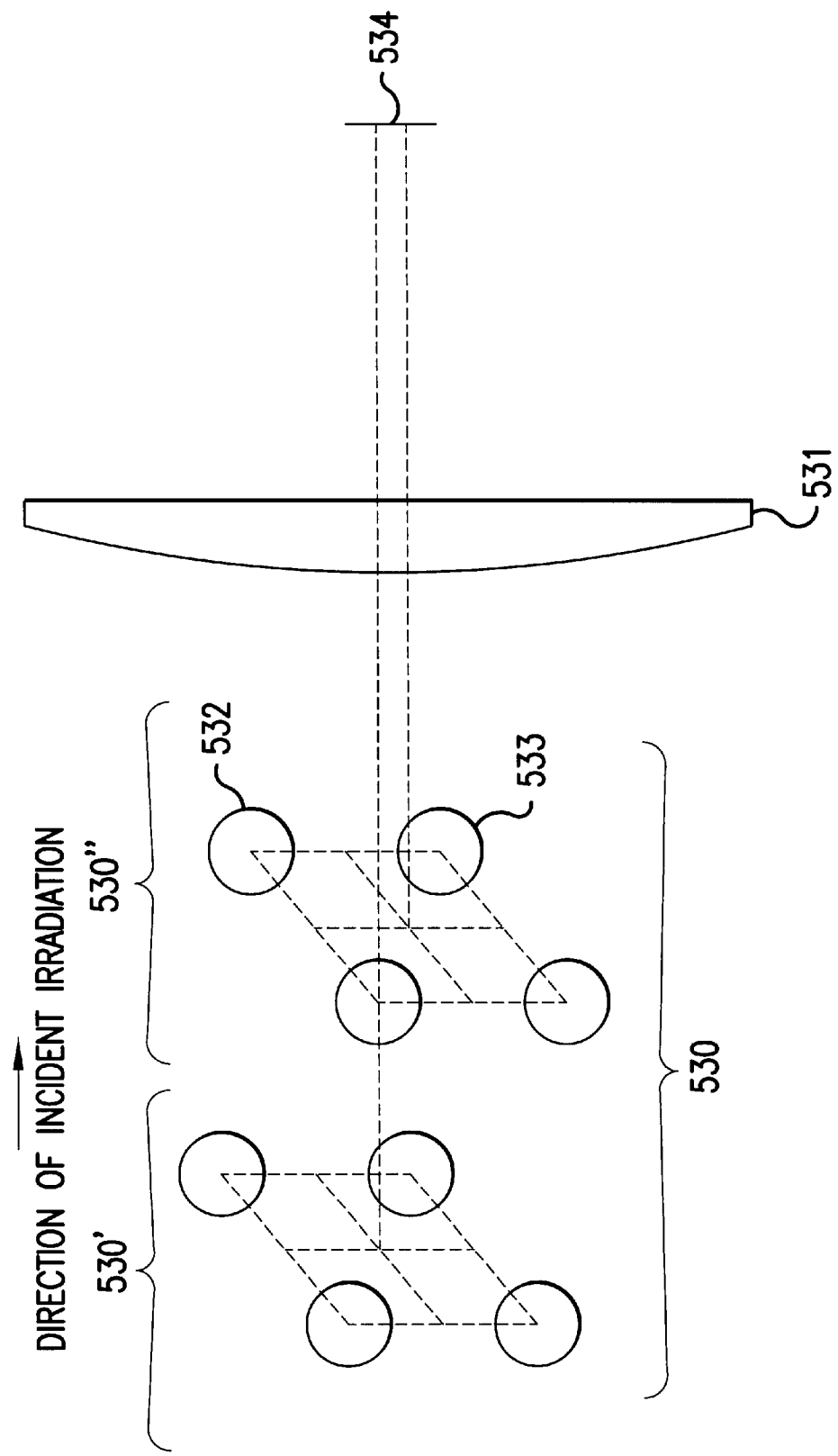
FIG. 5c is a schematic view of an optical layout of a refracting beam integrator in accordance with an embodiment of the present invention, wherein the apertures and their associated optical elements are arranged in a three dimensional arrangement.

In another preferred embodiment, the invention may be practiced using asymmetric or symmetric apertures arranged in three dimensions by having plurality of separate two-dimensionally arranged plurality of aperture/lenslet combinations. For example, as schematically shown in FIG. 5c, four apertures and four lenslets (e.g., 532 and 533, numbering only two for simplicity) may be arranged so that each aperture/lenslet combination is placed on a corner of a square (e.g., 530' or 530"); the square arrangement of aperture/lenslet combinations forming a two-dimensional arrangement. One then obtains a three dimensional arrangement 530 when one arranges a plurality of such two dimensional arrangements (e.g., 530' and 530"). The plurality of two-dimensional arrangement of aperture/lenslet combinations may be arranged so that the aperture/lenslet combinations, on different two-dimensional arrangements, are congruently or non-congruently overlayed. This arrangement 530 along with a primary integrator optical element (e.g., lens 531) may be used to reshape the profile of an incident irradiation and efficiently direct the incident irradiation onto a target 534.

A three-dimensional arrangement of aperture/lenslet combinations permits the variation of irradiation profile on a target by changing the angle of incidence of the irradiation onto the three-dimensional arrangement of apertures/lenslets. A three-dimensional arrangement of aperture/lenslet combinations also permits the variation of irradiation profile on a target by changing the orientation of the individual two-dimensional arrangements forming the three dimensional arrangement, or by changing the distance between the two-dimensional arrangements, or by changing both.

The arrangement of the plurality of aperture/lenslet combinations in each two-dimensional arrangement, forming the three-dimensional arrangement, may be geometrically similar or different, including different geometrical size and shape. For example, a two-dimensional arrangement of aperture/lenslet combination may be formed in a square arrangement while another may be formed in a rectangular shape, or triangular, or hexagonal, or circular (or any other polygonal), or random arrangement. Moreover, the individual apertures/lenslets may have the same shape and parameters, respectively, or different shapes and parameters.

The principles of the invention herein disclosed may be practiced using reflective optics as the optical elements, instead of using refractive optics, in the one, two, or three dimensional arrangements.

The output of the described optical layout is based on the assumption that it is the superposition of the diffraction fields of the beamlet apertures. The diffraction field is obtained using the Fresnel integral. If the beam is not spatially coherent over each beamlet aperture a more complicated integral is required and, generally, one would not be able to obtain a reasonable replica of the lenslet aperture.

Figure 6:
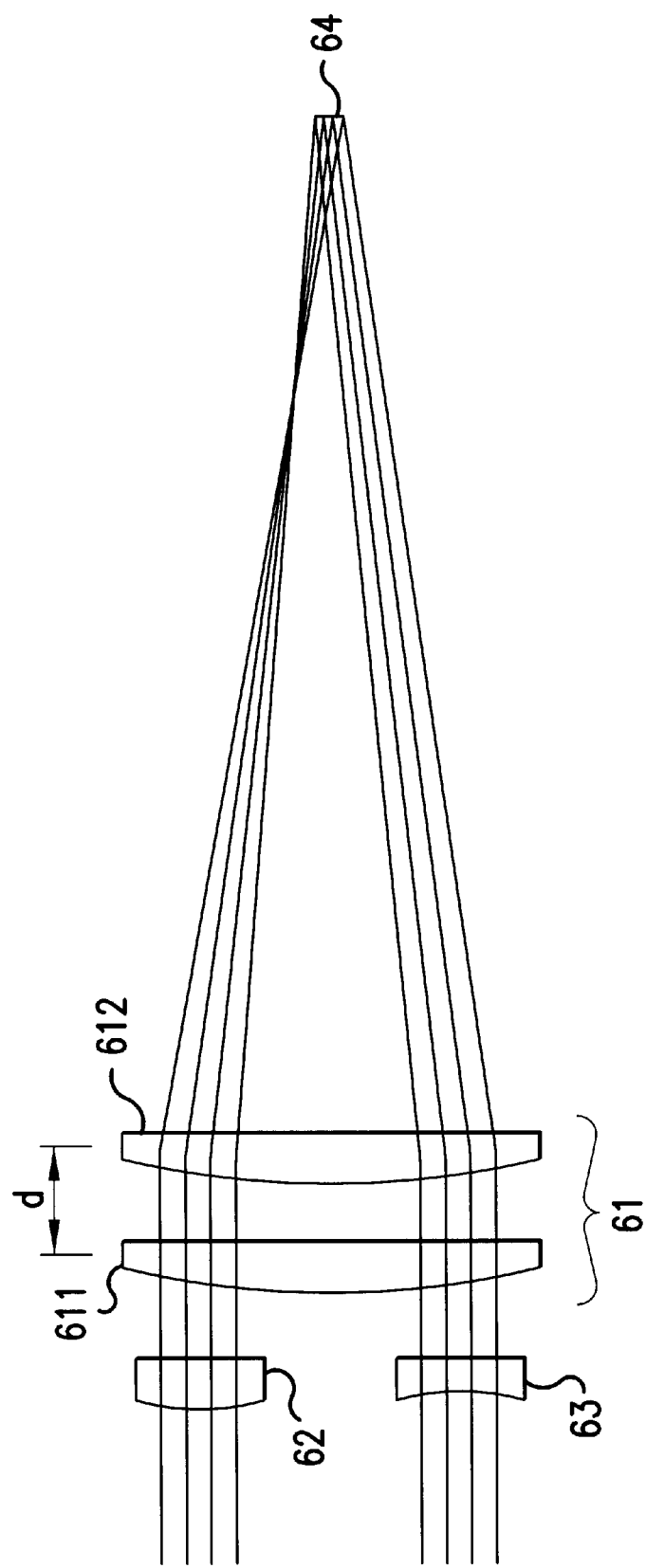
FIG. 6 is a schematic view of a zoom layout for a beam integrator providing variable spot size.

FIG. 6 presents an embodiment of the invention within an optical array comprising a zooming optical combination to achieve a variable spot size on target. The difference between FIG. 3a and FIG. 6 is the replacing of the primary lens 311 by the optical zoom combination 61. The zoom combination 61, having two lenses 611 and 612, represents an effective primary lens having a variable focal length that permits the varying of the spot size on target by changing the distance d between the two lenses 611 and 612. As is well known, the effective focal length for a two lens zooming combination is given by:

$$1/f_{\mathit{eff}} = 1/f_1 + 1/f_2 - d/(f_1 \times f_2) \qquad (4)$$

wherein d, $f_1$, and $f_2$ represent the distance between the two lenses 611 and 612 and their focal lengths, respectively. The two lens zoom combination embodiment is described just as an example because as is well known a plurality of more than two lenses may be used to form the zoom combination 61. Also as is well known, reflective optical elements instead of, or in addition to, refractive optical elements may be used in making the zoom combination 61.

The zooming combination layout may be used in conjunction with an arrangement of apertures (symmetric or asymmetric) with corresponding aberrated or unaberrated optical elements.

In addition to being refractive, the optical elements described above as lenslets may be reflective, diffractive-transmissive, or diffractive-reflective. Metallic reflective anamorphic or non-rotationally symmetric elements can be diamond turned. Photolithographic technology can be used to fabricate any of the above types of lenslet arrays. Photoresist of appropriate thickness is usually spun on a glass wafer and hardened by baking. Plastic or other optically suitable material may be used instead of glass. The lens surface profile is formed in the photoresist by exposure to UV light through chrome or gray scale masks and then development of the photoresist. The profile of the lens surface is then transferred into the glass by reactive ion etching or ion milling.

Figure 7:
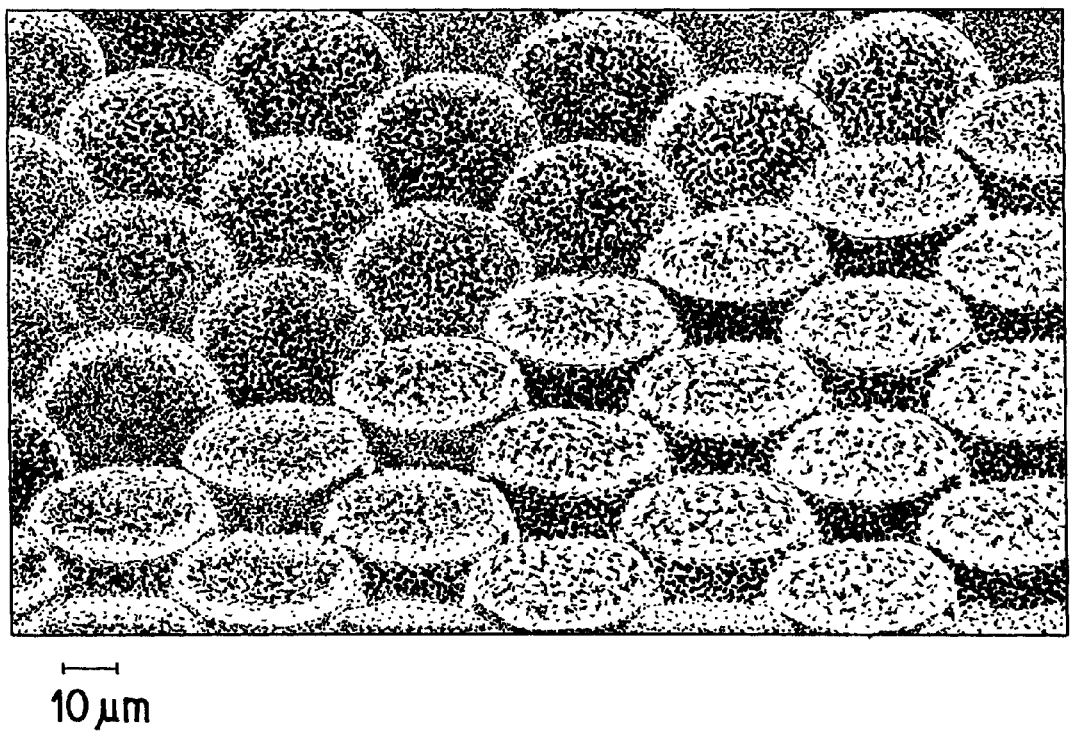
FIG. 7 is a picture of an array of positive and negative optical elements fabricated by gray scale mask technology.

In an alternative method for fabrication, the gray scale mask fabrication method solves the above problems. FIG. 7 shows an array of positive and negative optical elements fabricated by the gray scale mask technology. Presently, the inherent nonlinearities of this process often require iterative corrections to the gray scale mask to accurately produce the desired lenslet surface profile.

The principles of the herein disclosed may be used in numerous applications, including, but not limited to, laser heat processing (including medical and dental applications), laser machining, product marking, laser diode array integration for laser pumping and fiber injection, photolithographic mask aligners and steppers, and fiber injection systems.

The irradiation beams being shaped onto a target, using this invention, may cover the electromagnetic spectrum, including but not limited to, x-rays, ultra-violet frequencies, visible frequencies, infrared frequencies, millimeter-waves, and microwaves. The irradiation source may be coherent (as in lasers and masers), or may be incoherent (as in arc lamps) that is then made spatially coherent over a lenslet.

The apertures and their associated optical elements may be integrated into an aperture/optical element entity for example by the aperture being defined by the active transmitting area of a refractive lenslet, active reflecting area of a reflective lenslet, or active diffracting area of a diffractive optical element. Moreover, it is to be noted that the optical elements and the primary beam integrator may be formed as a single material entity. For example, when the optical elements and the primary integrator are refractive optical elements, then one may make an integrated optical structure wherein one side of the optical structure presents the lenslets and the other side is the primary beam integrator.

Although the present invention has been described and illustrated in detail, it is clearly understood that the description is only by way of illustration. The scope of the present invention should be limited only by the appended claims.

What is claimed is:

1. A multi-aperture irradiation profile shaping system comprising:
    an arrangement of apertures comprising at least three apertures; and
    an arrangement of optical elements having optical power, wherein each aperture in said arrangement is associated with an optical element of said arrangement of optical elements, wherein at least one optical element has a positive optical power and at least one element has negative optical power, and wherein said arrangement of apertures and associated optical elements yield a predetermined irradiation pattern on a target region.

2. A multi-aperture irradiation profile shaping system comprising:
    an arrangement of apertures comprising at least three apertures; and
    an arrangement of optical elements having optical power, wherein each aperture in said arrangement is associated with an optical element of said arrangement of optical elements, wherein at least one optical element has a positive optical power and at least one element has negative optical power, and wherein said arrangement of apertures have nearly a 100% fill factor.

3. The system as in claim 1, wherein said arrangement of apertures forms a one dimensional array.

4. The system as in claim 1, wherein said arrangement of apertures forms a two dimensional array.

5. The system as in claim 1, wherein said arrangement of apertures are distributed in a three dimensional geometry.

6. The system as in claim 1, further comprising irradiation incident on said arrangement of apertures and the target region containing irradiation produced from the interaction of said incident irradiation with said arrangement of apertures and their associated optical elements.

7. A multi-aperture irradiation profile shaping system comprising:
    an arrangement of apertures comprising at least three apertures;
    an arrangement of optical elements having optical power, wherein each aperture in said arrangement is associated with an optical element of said arrangement of optical elements, and wherein at least one optical element has a positive optical power and at least one element has negative optical power;
    further comprising irradiation incident on said arrangement of apertures;
    a target region containing irradiation produced from the interaction of said incident irradiation with said arrangement of apertures and their associated optical elements; and
    a primary optical element, wherein said arrangement of apertures, said associated optical elements, and said primary optical element yield a predetermined irradiation pattern on said target region.

8. The system as in claim 7, wherein said apertures in said arrangement have a shape being one of square, rectangle, and hexagonal.

9. The system as in claim 7, wherein said apertures have a shape that is 180 degree asymmetric so that a rotation of the aperture shape by 180 degrees around an axis perpendicular to the surface of the aperture yields an inverted aperture shape; and wherein some of the apertures bordering an aperture in said arrangement of apertures are flipped by 180 degree with respect to the aperture so as to have an inverted shape with respect to the aperture.

10. The system as in claim 7, wherein said arrangement of apertures comprise at least one reflective optical element.

11. The system as in claim 7, wherein said arrangement of optical elements comprise at least one diffractive optical element.

12. The system as in claim 7, wherein said arrangement of optical elements comprise at least one refractive optical element.

13. The system as in claim 7, wherein said arrangement of optical elements comprise at least one Fresnel optical element.

14. The system as in claim 7, wherein said primary optical element comprises a plurality of optical elements arranged into an optical zooming combination.

15. The system as in claim 14, wherein said arrangement of apertures, said associated optical elements, and said primary optical element yield said predetermined irradiation pattern.

16. A method for irradiation profile shaping comprising, the method comprising the steps:

arranging plurality of apertures comprising at least three apertures into an arrangement of apertures; and arranging optical elements having optical power into an arrangement of optical elements, wherein each aperture in said arrangement of apertures is associated with an optical element of said arrangement of optical elements, wherein at least one optical element has a positive optical power and at least one element has negative optical power, and wherein said arrangement of apertures, and said associated optical elements yield a predetermined irradiation pattern on a target region.

17. A method for irradiation profile shaping comprising, the method comprising the steps:

arranging plurality of apertures comprising at least three apertures into an arrangement of apertures; and arranging optical elements having optical power into an arrangement of optical elements, wherein each aperture in said arrangement of apertures is associated with an optical element of said arrangement of optical elements, wherein at least one optical element has a positive optical power and at least one element has negative optical power, and wherein said arrangement of apertures have nearly a 100% fill factor.

18. The method as in claim 16, wherein said arrangement of apertures forms a one dimensional array.

19. The method as in claim 16, wherein said arrangement of apertures forms a two dimensional array.

20. The method as in claim 16, wherein said arrangement of apertures are distributed in a three dimensional geometry.

21. The method as in claim 16, further comprising directing irradiation incident on said arrangement of apertures and arranging the target region containing irradiation produced from the interaction of said incident irradiation with said arrangement of apertures and their associated optical elements.

22. A method for irradiation profile shaping comprising, the method comprising the steps:

arranging plurality of apertures comprising at least three apertures into an arrangement of apertures;

arranging optical elements having optical power into an arrangement of optical elements, wherein each aperture in said arrangement of apertures is associated with an optical element of said arrangement of optical elements, and wherein at least one optical element has a positive optical power and at least one element has negative optical power;

directing irradiation incident on said arrangement of apertures;

arranging a target region containing irradiation produced from the interaction of said incident irradiation with said arrangement of apertures and their associated optical elements; and arranging a primary optical element, wherein said arrangement of apertures, said associated optical elements, and said primary optical element yield a predetermined irradiation pattern on said target region.

23. The method as in claim 22, wherein said apertures in said arrangement have a shape being one of square, rectangle, and hexagonal.

24. The method as in claim 22, wherein said apertures have a shape that is 180 degree asymmetric so that a rotation of the aperture shape by 180 degrees around an axis perpendicular to the surface of the aperture yields an inverted aperture shape; and wherein some of the apertures bordering an aperture in said arrangement of apertures are flipped by 180 degree with respect to the aperture so as to have an inverted shape with respect to the aperture.

25. The method as in claim 22, wherein said arrangement of apertures comprise at least one reflective optical element.

26. The method as in claim 22, wherein said arrangement of optical elements comprise at least one diffractive optical element.

27. The method as in claim 22, wherein said arrangement of optical elements comprise at least one refractive optical element.

28. The method as in claim 22, wherein said arrangement of optical elements comprise at least one Fresnel optical element.

29. The method as in claim 22, wherein said primary optical element comprises a plurality of optical elements arranged into an optical zooming combination.

30. The method as in claim 29, wherein said arrangement of apertures, said associated optical elements, and said primary optical element yield said predetermined irradiation pattern.

31. The method as in claim 22, further comprising the step of changing a parameter from at least one of said arrangement of apertures, said associated optical elements, and said primary optical element to change said predetermined irradiation pattern on said target region.

* * * * *